Jan. 12, 1932. W. L. CARLSON 1,841,317
INDUCTANCE UNIT
Filed April 10, 1930

Inventor:
Wendell L. Carlson,
by Charles E. Tullar
His Attorney.

Patented Jan. 12, 1932

1,841,317

UNITED STATES PATENT OFFICE

WENDELL L. CARLSON, OF HADDONFIELD, NEW JERSEY, ASSIGNOR TO GENERAL ELECTRIC COMPANY, A CORPORATION OF NEW YORK

INDUCTANCE UNIT

Application filed April 10, 1930. Serial No. 443,195.

The present invention relates to a high frequency inductance unit for use in tuned high frequency circuits, and more particularly it relates to an inductance unit for use in multiple tuned high frequency circuits.

Multiple tuned circuits are well-known in modern single dial control radio apparatus. Each of such circuits may include a fixed inductance and a variable capacitor, the fixed inductance being a coil of the single layer solenoid type, and the capacitor being a section of a single-control, gang-type variable condenser.

In order that a plurality of circuits may be tuned simultaneously to the same frequency over a relatively wide range of frequencies as is required in apparatus of the above character, both the coil and the condenser section of each circuit must be accurately matched to each other. Among other things, this means that the coils must be duplicates one of another with regard to their inductance values so that the inductance introduced into each of a series of multiple tuned circuits may be the same for each coil.

It is difficult and costly to produce accurately matched coils, that is, coils having the same predetermined inductance value, because of unavoidable slight differences in the spacing of the turns or unavoidable slight differences in diameter of the forms upon which the coils may be wound. Hence, precision work upon the coils for a multiple tuned circuit is relatively costly, and furthermore involves the careful testing and adjusting of each coil during manufacture.

It is, therefore, the object of the present invention to provide an improved inductance coil and means for adjusting its inductance, whereby such coil may have any desired degree of accuracy in its inductance value within certain limits, without resorting to precision workmanship in manufacture and the added cost of the latter.

A further object of the present invention is to provide a coil the inductance of which may readily be adjusted at any time to compensate for changes in other circuit constants.

The invention will be better understood from the following description when considered in connection with the accompanying drawings and its scope will be pointed out in the appended claims.

Figure 1:
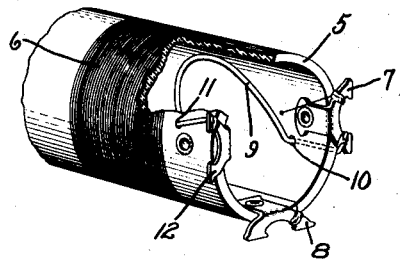
Figure 2:
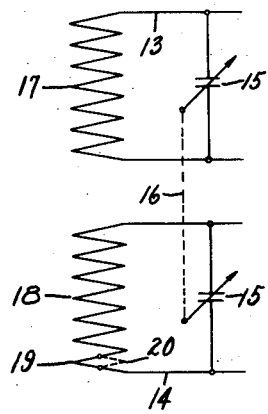

In the drawings, Fig. 1 is a view in perspective of an inductance coil embodying the invention; and Fig. 2 is a schematic wiring diagram of a multiple tuned radio frequency circuit embodying a coil constructed in accordance with the invention. The view in Fig. 1 is broken away to show the interior construction of the inductance coil.

Referring to Fig. 1, 5 is a suitable cylindrical coil form having a desired and preferably substantial uniform diameter. The coil form is of a length suitable for receiving a solenoid or helical winding 6 forming an inductance coil the terminal ends of which are indicated at 7 and 8. The winding is of any suitable conducting wire covered with insulation or spaced upon the form to prevent contact between adjacent turns, and is wound or placed upon the form in any suitable manner.

In series with the winding 6 and forming a part of it, is a wire 9, preferably bare and of sufficiently heavy gauge to be self supporting but flexible, mounted adjacent one end of the winding 6 and bent as indicated, in an arc, between two substantially diametrically opposite or opposed fixed supporting means provided on opposite sides of the axis of the coil, such as two holes 10 and 11 in the coil form.

With this arrangement, the ends of the arc shaped wire 9 are passed through the holes 10 and 11 and are secured to one of the winding terminals 7 and to a terminal 12, the latter forming with terminal 8 the two main terminals of the inductance unit. The arc-shaped wire is preferably connected with the terminal for the adjacent end of the winding, which in the present example is terminal 7.

The arc-shaped wire 9 may be moved about its fixed points of support 10 and 11, by any suitable means, to lie in any angular position with respect to the axis of the coil on either side thereof, the extreme angular positions of the wire on either side of the axis being those in which it stands at substantially a right angle thereto in a plane perpendicular to the coil axis and including the fixed points of support 10 and 11. The wire is preferably of such arc-shape that it may be moved through substantially 180 degrees about its points of support within and protected by the coil form, and conforms in shape to the interior of the coil form.

It will be seen that the wire may thus be moved to increase or decrease the inductance value of the unit by substantially one half turn or a total change of substantially one turn, since in one extreme position it provides substantially one half turn in the same direction as the main winding and aiding, and in the other extreme position it provides substantially one half turn in the opposite direction to the main winding and bucking. At intermediate points between the two extreme positions above mentioned, it serves to provide an intermediate effect upon the inductance of the unit by changing the winding by a fraction of one turn. The wire is sufficiently stiff or self supporting to maintain itself in an adjusted position as above mentioned.

It has been found that such inductance variation is sufficient to compensate for manufacturing variations in coils intended as duplicates one of another, for multiple tuned circuits and the like, where accurate matching of the inductance values is desirable or necessary.

The inductance adjusting means is relatively simple and inexpensive in construction since in its present form, for example, it includes a bent wire and an additional terminal in connection with the usual form of inductance winding shown, the wire being flexible whereby it may be bent to buck or aid the winding to vary the inductance thereof and thereby to compensate for unavoidable winding variations which tend to vary the intended inductance value of the unit or coil.

While the compensating wire or fractional winding turn as it may be termed, is in the present example associated with one end of the winding whereby it is more easily accessible for adjustment through the end of the coil or winding form, it may be located at any suitable point within the field of the winding where it may have a controlling effect upon the inductance of the same, and is arranged preferably to swing about a diametral line through the axis of the winding in order that substantially the full turn variation in the inductance may be obtained.

Referring now to Fig. 2, 13 and 14 represent two tuned high frequency circuits which include two variable condensers 15 arranged for multiple or single control tuning by a connection 16 and two inductances 17 and 18, one connected in parallel with each condenser.

For simultaneous tuning to the same frequency over a range of frequencies, condensers 15 have the same tuning characteristics and inductances 17 and 18 have the same inductance values. Because of manufacturing variations, the inductances may have slightly different values unless carefully adjusted or provided with adjusting means such as that above described, and indicated on inductance 18 by a half turn 19. By moving the half turn 19 to an adjusted position between the positions shown and its other extreme position indicated at 20, the inductance of coil 18 may be adjusted to match that of inductance 17 whereby the two circuits may be tuned to the same frequency by a multiple tuning means such as the connected condensers 15.

While but one of the inductances of the above example is provided with an adjusting means embodying the invention, it should be understood that both inductances may include the adjusting means. In general, however, multiple tuned circuits may be adjusted to the same frequencies by adjusting the inductance of all of the inductance units except one, the inductance of all of the units being adjusted to that of the one. This arrangement is followed in the above example.

Inductance units of the above description are particularly valuable for use in connection with multiple tuned circuits since the addition of the inductance adjusting feature is relatively simple and may be made at low cost. This eliminates the need for precision workmanship in the construction of the inductance units and has the further advantage that when included in a plurality of tuned circuits the adjustment may be made or changed at any time to match the particular setting of the variable tuning element used in connection with the inductances.

What I claim as new and desire to secure by Letters Patent of the United States is:

1. An adjustable inductance including a winding and an arc-shaped wire in series with said winding and arranged to lie within the field of said winding, said wire being of flexible material whereby it may be bent to extend within the field of the winding to increase or decrease the inductance of said winding.

2. An adjustable inductance unit including an inductance winding, an arc-shaped wire mounted at its ends in the field of and forming a part of the winding, said wire being movable between its ends in said field to lie in a position between the same and a reverse winding direction with respect to the inductance winding, whereby the inductance of said unit may be adjusted.

3. An adjustable inductance unit including an inductance winding, an arc-shaped wire mounted at its ends adjacent one end of and forming substantially one half turn of the winding, said wire being rotatable about a diameter of the winding between positions in which it lies substantially parallel with the winding, whereby the inductance of the unit may be adjusted by moving said wire to a position between and including said positions, said wire being adapted to remain in an adjusted position by its own rigidity between its supported ends.

4. An adjustable inductance unit including an inductance winding, an arc-shaped wire mounted at its ends adjacent one end of and forming a portion of one turn of the winding, said wire being supported at its ends at diametrically opposite points on either side of the axis of the winding and conforming in shape to the curvature of the winding, said wire being movable between its ends and on opposite sides of the axis of the winding to increase and decrease the effective inductance of the winding, a cylindrical winding form forming a common support for the winding and the ends of said wire and a protective enclosure for the wire, and terminals for the winding and said wire carried by said form.

5. An adjustable inductance unit including a cylindrical winding form, an inductance winding carried by said form, a wire forming a portion of one turn of said winding, said wire being of flexible material having sufficient rigidity to maintain itself in an adjusted position, and being supported at its ends at diametrically opposite points in the coil form and being rotatable about its ends to add to or to subtract from the total inductance of the winding.

6. In an electrical apparatus including a plurality of multiple tuned high frequency circuits, each of said circuits including an inductance and means associated with said inductance for varying the tuning of said circuit, said means being arranged to be operated simultaneously, means associated with at least one of said inductances for varying the total inductance thereof, said means including an arc-shaped wire in series with and forming a part of said inductance, said wire being mounted adjacent one end of said inductance and being movable between its ends to increase and decrease the effective value of said inductance.

7. An adjustable inductance including a wire in series with and forming a part of said inductance, said wire being mounted adjacent one end of said inductance and being movable between its ends to increase and decrease the effective value of said inductance.

In witness whereof, I have hereunto set my hand this 7th day of April, 1930.

WENDELL L. CARLSON.